United States Patent [19]
Aritake

[11] Patent Number: 6,070,982
[45] Date of Patent: Jun. 6, 2000

[54] COLOR SEPARATION ELEMENT AND PROJECTION APPARATUS

[75] Inventor: Hirokazu Aritake, Kawasaki, Japan

[73] Assignee: Fujitsu Limited, Kawasaki, Japan

[21] Appl. No.: 09/275,799

[22] Filed: Mar. 25, 1999

[30] Foreign Application Priority Data

Jul. 6, 1998 [JP] Japan .................................. 10-190620

[51] Int. Cl.⁷ .................................................. G03B 21/14
[52] U.S. Cl. .................................. 353/20; 349/9; 359/487
[58] Field of Search .............................. 353/20, 31, 34; 349/8, 9; 359/487, 488, 490, 495, 500

[56] References Cited

U.S. PATENT DOCUMENTS

| | | |
|---|---|---|
| 4,798,448 | 1/1989 | van Raalte . |
| 5,237,446 | 8/1993 | Takahashi ................. 359/490 |
| 5,568,315 | 10/1996 | Shuman ................... 359/487 |
| 5,650,874 | 7/1997 | Shuman ................... 359/487 |
| 5,748,369 | 5/1998 | Yokota .................... 359/487 |
| 5,748,379 | 5/1998 | Salsman et al. .......... 359/634 |
| 5,784,181 | 7/1998 | Loiseaux et al. ............ 359/1 |

FOREIGN PATENT DOCUMENTS

| | | |
|---|---|---|
| 0 708 568 A1 | 4/1996 | European Pat. Off. . |
| 0 753 780 A1 | 1/1997 | European Pat. Off. . |
| 4-60538 | 2/1992 | Japan . |
| 7-181487 | 7/1995 | Japan . |

OTHER PUBLICATIONS

Patent Abstracts of Japan, vol. 199, No. 808, Jun. 30, 1998 & JP 10 062775 A (NEC Corp), Mar. 6, 1998 * abstract *.
Patent Abstracts of Japan, vol. 199, No. 811, Sep. 30, 1998 & JP 10 161255 A (Hitachi LTD), Jun. 19, 1998 * abstract *.

*Primary Examiner*—William Dowling
*Attorney, Agent, or Firm*—Armstrong, Westerman, Hattori, McLeland & Naughton

[57] ABSTRACT

A color separation element includes a polarization dependent reflecting element having a different reflectivity dependent on a polarization plane and a wavelength of an incident light, and a polarization converting element, arranged at a predetermined angle to the polarization dependent reflecting element. The polarization converting element converts one linearly polarized light between a p-polarized light component and a s-polarized light component transmitted through the polarization dependent reflecting element into the other linearly polarized light which is reflected towards the polarization dependent reflecting element, and converts the other linearly polarized light between the p-polarized light component and the s-polarized light component transmitted through the polarization dependent reflecting element into the one linearly polarized light which is reflected towards the polarization dependent reflecting element.

13 Claims, 14 Drawing Sheets

COLOR SEPARATION ELEMENT AND PROJECTION APPARATUS

BACKGROUND OF THE INVENTION

1. Field of the Invention

The present invention generally relates to color separation elements and projection apparatuses, and more particularly to a color separation element for making a color separation and to a projection apparatus which projects an image on a screen using such a color separation element.

A projection apparatus which displays an image by projecting a light obtained via a liquid crystal display on a screen is used as a display unit of television systems, video systems, information display systems and the like.

2. Description of the Related Art

FIG. 1 is a diagram showing an important part of an example of a conventional projection apparatus. In FIG. 1, a light from a light source 101 is supplied to a projection lens 103 via a dichroic mirror optical system 102, and an image is displayed on a screen (not shown) by projecting the light from the projection lens 103 on the screen. The dichroic mirror optical system 102 includes dichroic mirrors (DM) 121 through 124, liquid crystal panels 125 through 127, and mirrors 128 and 129.

A red (R) light within the light from the light source 101 is transmitted through the dichroic mirror 121, reflected by the mirror 128, transmitted through the liquid crystal panel 125 which displays R pixel data and the dichroic mirror 123, and reaches the projection lens 103 by being reflected by the dichroic mirror 124. A green (G) light within the light from the light source 101 is reflected by the dichroic mirrors 121 and 122, transmitted through the liquid crystal panel 125 which displays G pixel data, and reaches the projection lens 103 by being reflected by the dichroic mirrors 123 and 124. A blue (B) light within the light from the light source 101 is reflected by the dichroic mirror 121, transmitted through the dichroic mirror 122 and the liquid crystal panel 127 which displays B pixel data, and reaches the projection lens 103 by being reflected by the mirror 129 and then transmitted through the dichroic mirror 124.

FIG. 2 is a diagram showing an important part of another example of the conventional projection apparatus. In FIG. 2, those parts which are the same as those corresponding parts in FIG. 1 are designated by the same reference numerals, and a description thereof will be omitted. In FIG. 2, the R light within the light from the light source 101 is reflected by a dichroic mirror 131, and reaches the projection lens 103 via a lens array 134, a RGB liquid crystal panel 135 and a condenser lens 136. The G light within the light from the light source 101 is transmitted through the dichroic mirror 131, is reflected by a dichroic mirror 132, and reaches the projection lens 103 via the lens array 134, the RGB liquid crystal panel 135 and the condenser lens 136. In addition, the B light within the light from the light source 101 is transmitted through the dichroic mirror 132, is reflected by a dichroic mirror 133, and reaches the projection lens 103 via the lens array 134, the RGB liquid crystal panel 135 and the condenser lens 136. For example, the projection apparatus of this type is proposed in a Japanese Laid-Open Patent Application No.4-60538.

In the case of the conventional projection apparatus shown in FIG. 1, the dichroic mirror optical system 102 includes the four dichroic mirrors 121 through 124, the three panels 125 through 127, and the two mirrors 128 and 129. Hence, there were problems in that the number of parts is large, it is difficult to reduce the size of the projection apparatus, and it takes time to adjust mounting positions of each of the large number of parts.

On the other hand, in the case of the conventional projection apparatus shown in FIG. 2, the construction of the optical system is slightly simpler when compared to the conventional projection apparatus shown in FIG. 1. However, it is still necessary to provide the three dichroic mirrors 131 through 133, and each of the dichroic mirrors 131 through 133 must be mounted to satisfy a predetermined relationship with respect to the incident angle of the light from the light source 101. As a result, there was a problem in that it takes time to adjust the mounting positions of each of the parts.

Moreover, in the conventional projection apparatuses shown in FIGS. 1 and 2, the color separation element has a complex construction, and it requires troublesome and time consuming processes to mount the elements which form the color separation element and to adjust the mounting position thereof. For these reasons, there are also demands to realize a color separation element which has a simple construction and can be easily mounted and easily be adjusted of the mounting position.

SUMMARY OF THE INVENTION

Accordingly, it is a general object of the present invention to provide a novel and useful color separation element and a projection apparatus, in which the problems described above are eliminated.

Another and more specific object of the present invention to provide a color separation element which has a simple construction and can easily be mounted and easily be adjusted of the mounting position, and to provide a projection apparatus which uses such a color separation element.

Still another object of the present invention is to provide a color separation element comprising polarization dependent reflecting element having a different reflectivity dependent on a polarization plane and a wavelength of an incident light, and a polarization converting element, arranged at a predetermined angle to the polarization dependent reflecting element, converting one linearly polarized light between a p-polarized light component and a s-polarized light component transmitted through the polarization dependent reflecting element into the other linearly polarized light which is reflected towards the polarization dependent reflecting element, and converting the other linearly polarized light between the p-polarized light component and the s-polarized light component transmitted through the polarization dependent reflecting element into the one linearly polarized light which is reflected towards the polarization dependent reflecting element.

The color separation element may further comprise a transparent member unitarily fixed between the polarization dependent reflecting element and the polarization converting element so as to maintain the predetermined angle.

The color separation element may further comprise a transparent member provided on a side of the polarization dependent reflecting element first receiving the incident light.

In the color separation element, a linearly polarized light component in an unwanted wavelength region may be eliminated by selecting settings of an incident angle of the incident light with respect to the polarization dependent reflecting element and the predetermined angle.

A further object of the present invention is to provide a color separation element comprising a polarization dependent reflecting element reflecting a light in a first wavelength region and transmitting a light in wavelength regions other than the first wavelength region with respect to a first polarized light component, and reflecting a light in a second wavelength region and transmitting a light in wavelength regions other than the second wavelength region with respect to a second polarized light component, and polarization converting element, arranged at a predetermined angle to the polarization dependent reflecting element, converting a polarized light component of the light transmitted through the polarization dependent reflecting element into an orthogonal polarized light component which is reflected towards the polarization dependent reflecting element.

According to the color separation element of the present invention, it is possible to realize a color separation element which has a simple construction, and can easily be mounted and easily be adjusted of the mounting position.

Another object of the present invention is to provide a projection apparatus comprising a light source, a color separation element comprising a polarization dependent reflecting element and a polarization converting element, the polarization dependent reflecting element having a different reflectivity dependent on a polarization plane and a wavelength of an incident light from the light source, the polarization converting element being arranged at a predetermined angle to the polarization dependent reflecting element, and converting one linearly polarized light between a p-polarized light component and a s-polarized light component transmitted through the polarization dependent reflecting element into the other linearly polarized light which is reflected towards the polarization dependent reflecting element, and converting the other linearly polarized light between the p-polarized light component and the s-polarized light component transmitted through the polarization dependent reflecting element into the one linearly polarized light which is reflected towards the polarization dependent reflecting element, and a modulating element receiving at least three linearly polarized light components from the color separation element, and outputting a light which is to be projected on a screen via a projecting system.

In the projection apparatus, the modulating element may comprise a first microlens array layer, a liquid crystal array layer receiving the linearly polarized light component via the first microlens array layer, and a second microlens array layer, arranged at a stage prior to the first microlens array layer, adjusting an incident angle of the light output to the projecting system.

In the projection apparatus, the modulating element may further comprise an angle dividing element making a shift so that an incident angle of the light to the liquid crystal array layer and an emission angle of the light from the liquid crystal array layer are different from each other.

In the projection apparatus, the color separation element may further comprise a transparent member unitarily fixed between the polarization dependent reflecting element and the polarization converting element so as to maintain the predetermined angle.

In the projection apparatus, the color separation element may further comprise a transparent member provided on a side of the polarization dependent reflecting element first receiving the incident light.

In the projection apparatus, the color separation element may eliminate a linearly polarized light component in an unwanted wavelength region by selecting settings of an incident angle of the incident light with respect to the polarization dependent reflecting element and the predetermined angle.

Still another object of the present invention is to provide a projection apparatus comprising a light source, a color separation element comprising a polarization dependent reflecting element and a polarization converting element, the polarization dependent reflecting element reflecting a light in a first wavelength region and transmitting a light in wavelength regions other than the first wavelength region with respect to a first polarized light component, and reflecting a light in a second wavelength region and transmitting a light in wavelength regions other than the second wavelength region with respect to a second polarized light component, the polarization converting element being arranged at a predetermined angle to the polarization dependent reflecting element, and converting a polarized light component of the light transmitted through the polarization dependent reflecting element into an orthogonal polarized light component which is reflected towards the polarization dependent reflecting element, a modulating element receiving at least three linearly polarized light components from the color separation element and outputting a light, and a screen on which the light output from the modulating element is projected.

According to the projection apparatus of the present invention, it is possible to realize a projection apparatus having a small number of parts and has a small size, and the mounting position of each of the parts can be adjusted within a short time.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIGS. 3 and 4.

Figure 3:
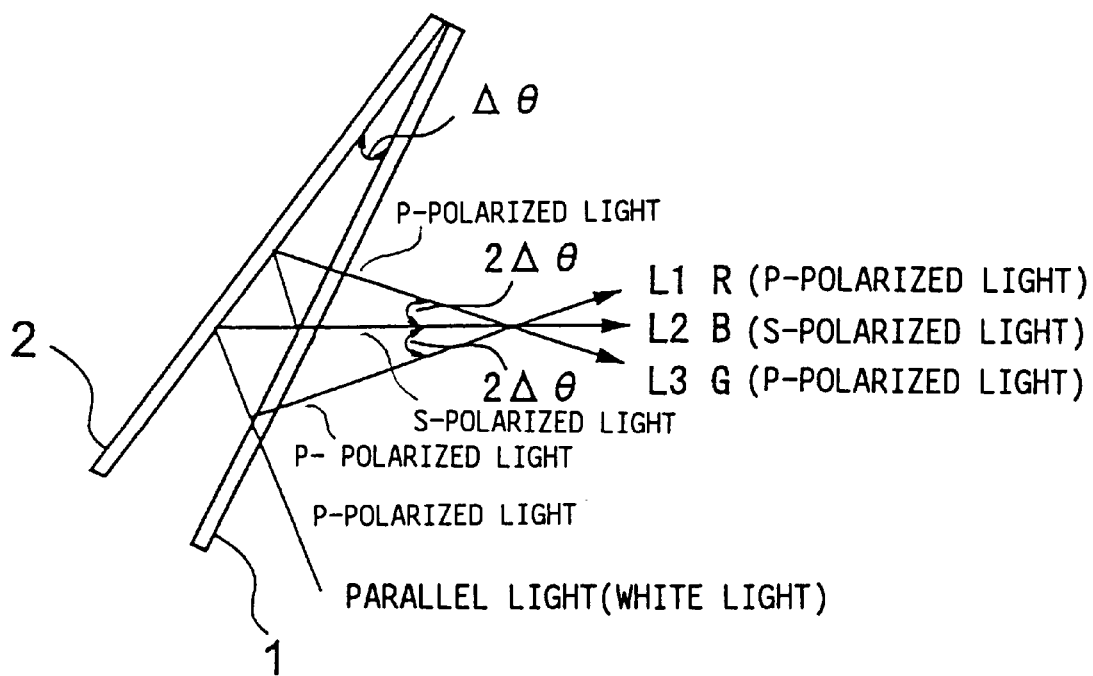
FIG. 3 is a diagram for explaining the operating principle of a color separation element according to the present invention.
Figure 4:
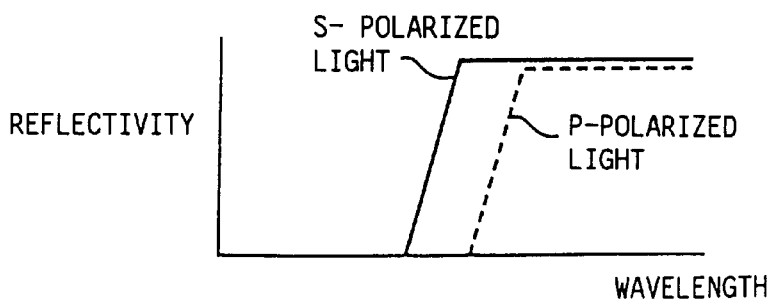
FIG. 4 is a diagram showing a characteristic of a polarization dependent reflecting element.

FIG. 3 is a diagram for explaining the operating principle of a color separation element according to the present invention, and FIG. 4 is a diagram showing a characteristic of a polarization dependent reflecting element. In FIG. 4, the ordinate indicates the reflectivity, and the abscissa indicates the wavelength of the light.

As shown in FIG. 3, the color separation element includes a polarization dependent reflecting element 1 and a polarization converting element 2. As shown in FIG. 4, the polarization dependent reflecting element 1 has a different reflectivity depending on the polarization plane and the wavelength of an incident light, and has a characteristic for reflecting only a linearly polarized light component having a wavelength greater than or equal to a predetermined wavelength. In FIG. 4, a solid line indicates a s-polarized light component, and a dotted line indicates a p-polarized light component. On the other hand, the polarization converting element 2 is arranged to form a predetermined angle Δθ with respect to the polarization dependent reflecting element 1. The polarization converting element 2 converts one linearly polarized light between the p-polarized light component and the s-polarized light component transmitted through the polarization dependent reflecting element 1 into the other linearly polarized light which is reflected towards the polarization dependent reflecting element 1, and converts the other linearly polarized light between the p-polarized light component and the s-polarized light component transmitted through the polarization dependent reflecting element 1 into the one linearly polarized light which is reflected towards the polarization dependent reflecting element 1. In other words, the polarization converting element 2 converts the p-polarized light component into the s-polarized light component, and converts the s-polarized light component into the p-polarized light component.

Accordingly, in the case where the incident light is a p-polarized parallel white light, a p-polarized light component L1 of R, for example, is reflected by the polarization dependent reflecting element 1 and output. In addition, the p-polarized light components of G and B are transmitted through the polarization dependent reflecting element 1, and the s-polarized light components of G and B are reflected by the polarization converting element 2 towards the polarization dependent reflecting element 1. Between the s-polarized light components of G and B, a s-polarized light component L2 of B is transmitted through the polarization dependent reflecting element 1 and output. On the other hand, the s-polarized light component of G is reflected by the polarization dependent reflecting element 1 towards the polarization converting element 2 again. This s-polarized light component of G is reflected by the polarization converting element 2 as a p-polarized light component of G towards the polarization dependent reflecting element 1. As a result, a p-polarized light component L3 of G is transmitted through the polarization dependent reflecting element 1 and output.

The predetermined angle Δθ described above is set depending on emission angles of the polarized light components L1, L2 and L3 of the three colors, so that a difference between the emission angles of the polarized light components L1 and L2 is 2Δθ, and a difference between the emission angles of the polarized light components L2 and L3 is 2Δθ.

Because the construction of the color separation element is simple, the mounting of the elements forming the color separation element and the adjustment of the mounting positions of these elements can be carried out in a simple manner. As a result, it is possible to easily mount the color separation element and to easily adjust the mounting position thereof. Furthermore, if a transparent member is unitarily fixed between the polarization dependent reflecting element 1 and the polarization converting element 2 so as to maintain the predetermined angle Δθ described above, it is unnecessary to adjust the relative positions of the polarization dependent reflecting element 1 and the polarization converting element 2.

Figure 1:
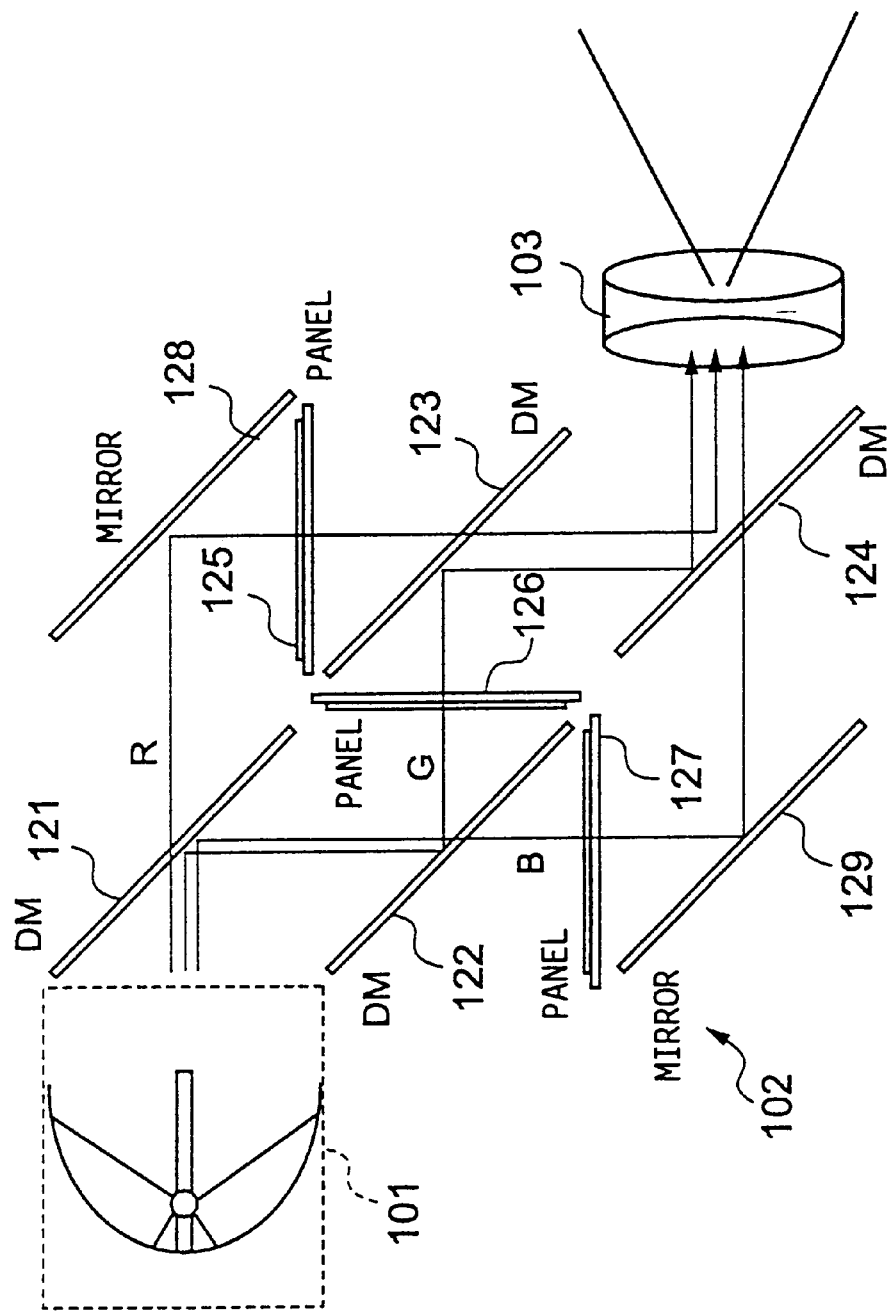
FIG. 1 is a diagram showing an important part of an example of a conventional projection apparatus.
Figure 2:
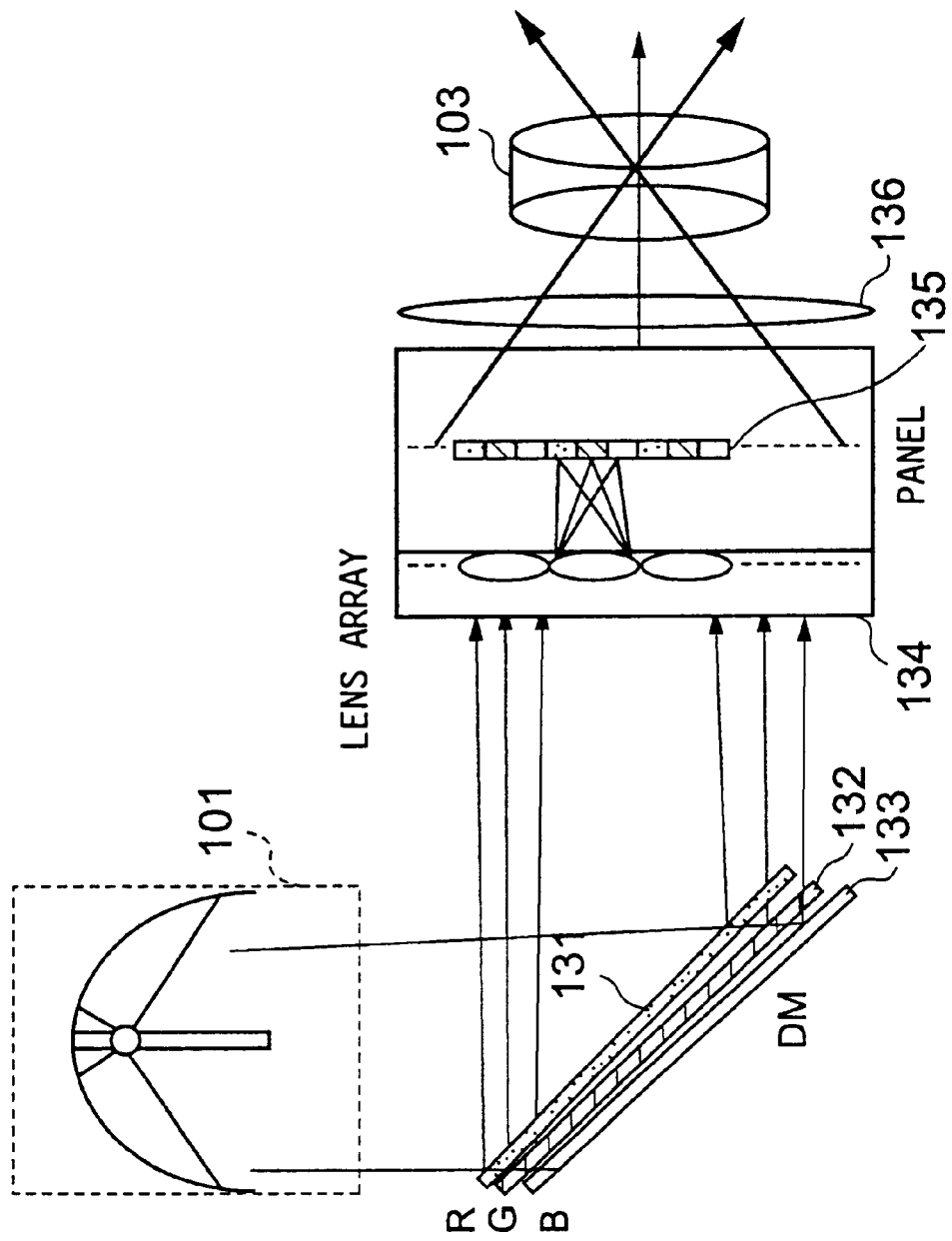
FIG. 2 is a diagram showing an important part of another example of the conventional projection apparatus.
Figure 5:
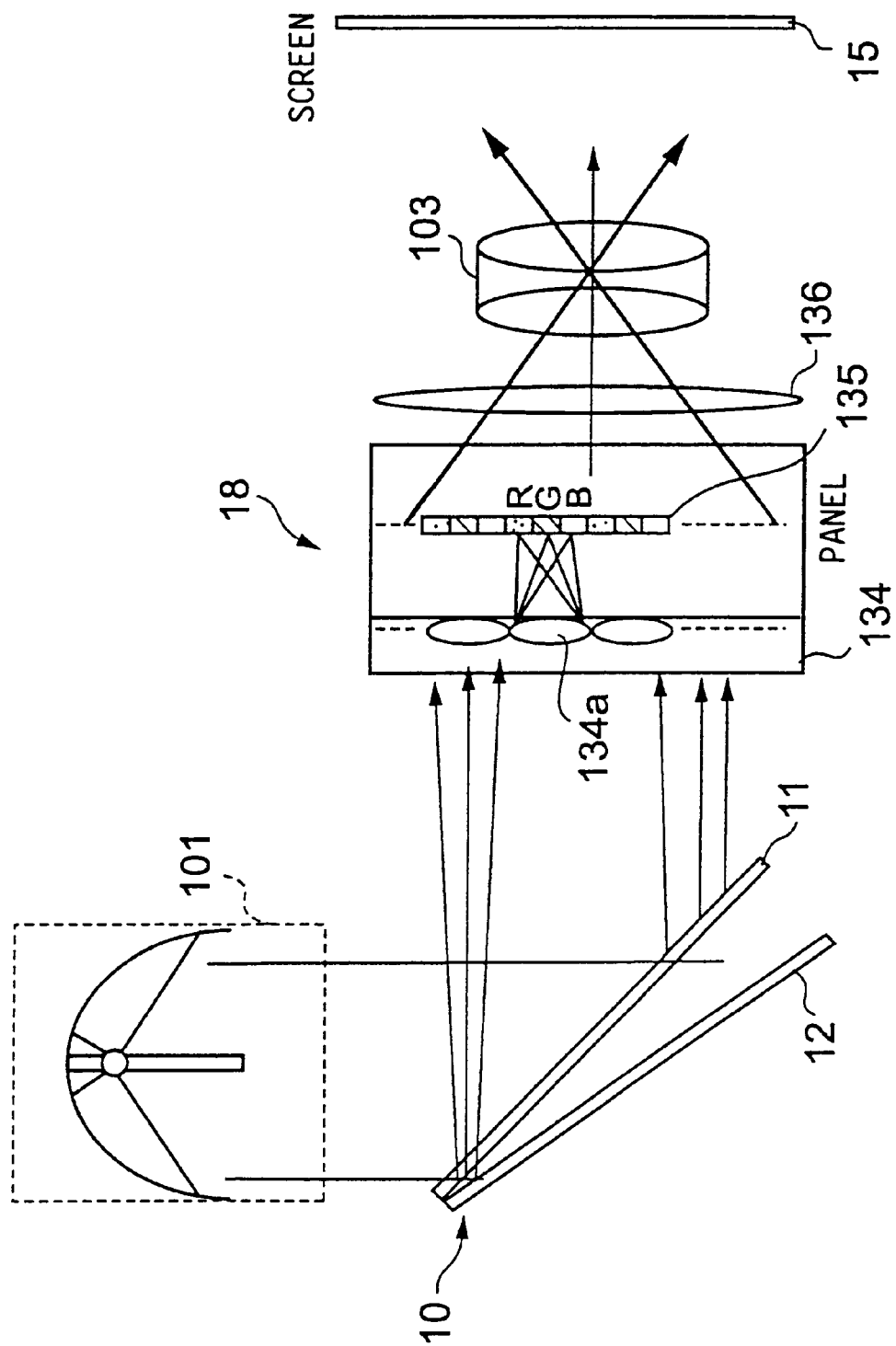
FIG. 5 is a diagram showing an important part of a first embodiment of a projection apparatus according to the present invention.
Figure 6:
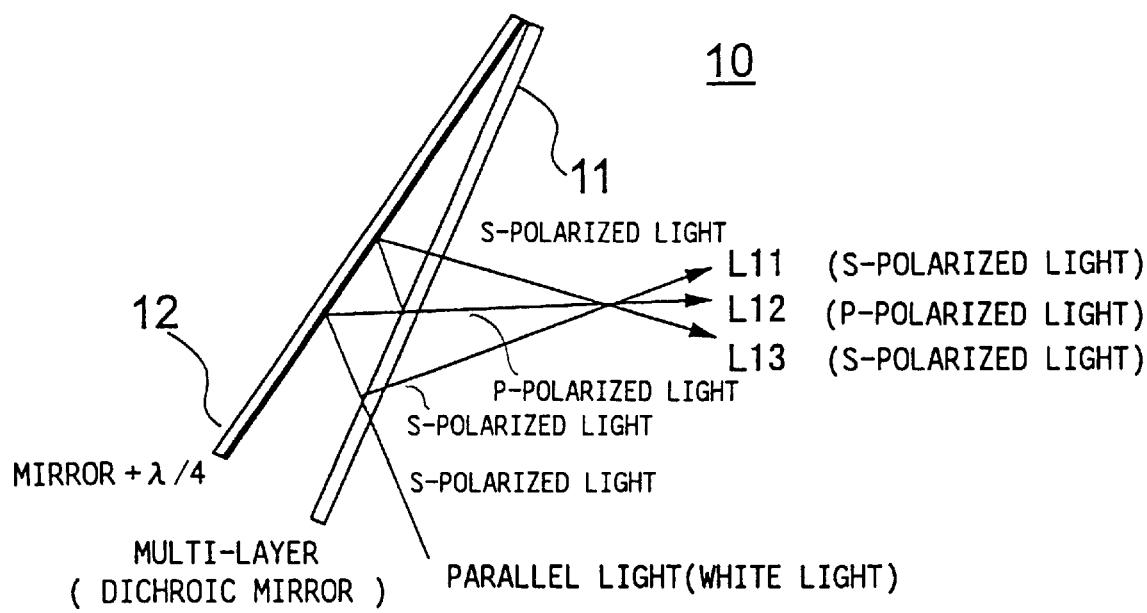
FIG. 6 is a diagram showing a first embodiment of the color separation element according to the present invention.
Figure 7:
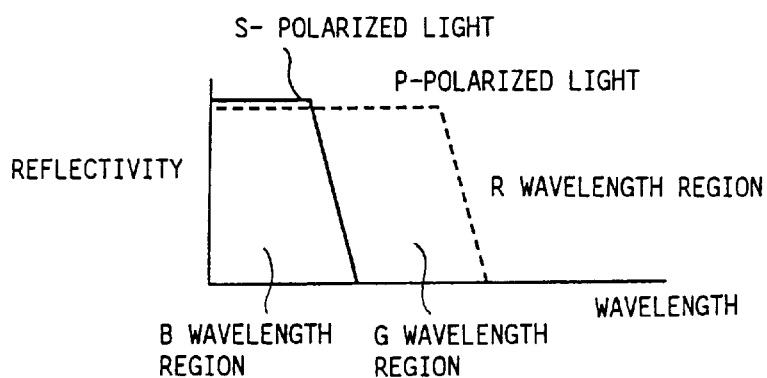
FIG. 7 is a diagram showing a characteristic of a polarization dependent reflecting element of the first embodiment of the color separation element.

FIG. 5 is a diagram showing an important part of a first embodiment of a projection apparatus according to the present invention. In FIG. 5, those parts which are the same as those corresponding parts in FIG. 2 are designated by the same reference numerals, and a description thereof will be omitted. This first embodiment of the projection apparatus employs a first embodiment of a color separation element according to the present invention. FIG. 6 is a diagram showing a characteristic of a polarization dependent reflecting element of a first embodiment of a color separation element. In FIG. 7, the ordinate indicates the reflectivity, and the abscissa indicates the wavelength of the light.

In FIG. 5, the parallel white light from the light source 101 reaches the projection lens 103 via a color separation element 10, the lens array 134, the RGB liquid crystal panel 135 and the condenser lens 136, and an image output from the projection lens 103 is projected on a screen 15. The screen 15 may be assembled on a housing (not shown) of the projection part shown in FIG. 5 or, may be independent of the projection part. As shown in FIG. 6, the color separation element 10 includes a polarization dependent reflecting element 11 and a polarization converting element 12. The lens array 134 and the RGB liquid crystal panel 135 form a modulating element 18.

As shown in FIG. 7, the polarization dependent reflecting element 11 has a different reflectivity depending on the polarization plane and the wavelength of the incident light, and has a characteristic for reflecting only a linearly polarized light component having a wavelength greater than or equal to a predetermined wavelength. More particularly, the polarization dependent reflecting element 11 reflects the light having a wavelength in the regions of B and G of the p-polarized light indicated by a dotted line in FIG. 7, and transmits the light having other wavelengths.

In addition, the polarization dependent reflecting element 11 reflects the light having a wavelength in the region of B in the s-polarized light indicated by a solid line in FIG. 7, and transmits the light having other wavelengths. In this embodiment, the polarization dependent reflecting element 11 is formed by a dichroic filter or a dichroic mirror having a multi-layer structure which is made up of a material having a small refractive index such as MgF and a material having a large refractive index such as $TiO_2$. In order to increase the shift of the cut wavelength caused by the polarization, it is possible to increase the refractive index of the material forming the multi-layer structure of the polarization dependent reflecting element 11 or, to increase the incident angle of the incident light with respect to the polarization dependent reflecting element 11.

On the other hand, the polarization converting element 12 is arranged to formed a predetermined angle to the polarization dependent reflecting element 11. The polarization converting element 12 converts a p-polarized light component transmitted through the polarization dependent reflecting element 11 into a s-polarized light component which is reflected towards the polarization dependent reflecting element 11, and converts a s-polarized light component transmitted through the polarization dependent reflecting element into a p-polarized light component which is reflected towards the polarization dependent reflecting element 11. In this embodiment, the polarization converting element 12 is made up of a mirror and a $\lambda/4$ wave plate. The light incident to the polarization converting element 12 is transmitted through the $\lambda/4$ wave plate before reaching the mirror, and thus, the light is reflected by the mirror and is again transmitted through the $\lambda/4$ wave plate. Hence, the light incident to the polarization converting element 12 receives an effect similar to that of being transmitted through a $\lambda/2$ wave plate, and the polarization plane is rotated thereby.

Accordingly, in the case where the incident light is a s-polarized parallel white light, a s-polarized light component L11 of B, for example, is reflected by the polarization dependent reflecting element 11 and is output from the color separation element 10. In addition, s-polarized light components of G and R are transmitted through the polarization dependent reflecting element 11, and is reflected by the polarization converting element 12 as p-polarized components of G and R towards the polarization dependent reflecting element 11. Between the p-polarized light components of G and R, a p-polarized light component L12 of R is transmitted through the polarization dependent reflecting element 11 and is output from the color separation element 10. On the other hand, the p-polarized light component of G is reflected by the polarization dependent reflecting element 11 again towards the polarization converting element 12. The p-polarized light component of B is also included in the reflecting band of the polarization dependent reflecting element 11, but the p-polarized light component of B is already reflected, and the light incident to the polarization dependent reflecting element 11 in this state includes virtually no B component. The p-polarized light component of G is reflected by the polarization converting element 12 as a s-polarized component of G towards the polarization dependent reflecting element 11. As a result, a s-polarized light component L13 of G is transmitted through the polarization dependent reflecting element 11 and is output from the color separation element 10. Among the linearly polarized light components L11 through L13 output from the color separation element 10, one of the two mutually adjacent linearly polarized light components is the p-polarized light component and the other is the s-polarized light component.

In other words, when the s-polarized light having the narrower reflecting wavelength region is incident to the color separation element 10, the rotation of the polarization plane and the polarization dependency of the reflecting wavelength characteristic causes the lights of B, R and G to be output successively.

As described above, the s-polarized light component L11 of B, the p-polarized light component L12 of R and the s-polarized light component L13 of G which are spectrally separated into three directions having different emission angles, so as to input the lights to the pixels corresponding to each of the colors B, R and G, are input to the corresponding pixels of B, R and G of the liquid crystal panel 135, by a microlens 134a provided in the lens array 134 within the modulating element 18. In this embodiment, the modulating element 18 is a transmission type element, and thus, the liquid crystal panel 135 is also a transmission type element.

Figure 8:
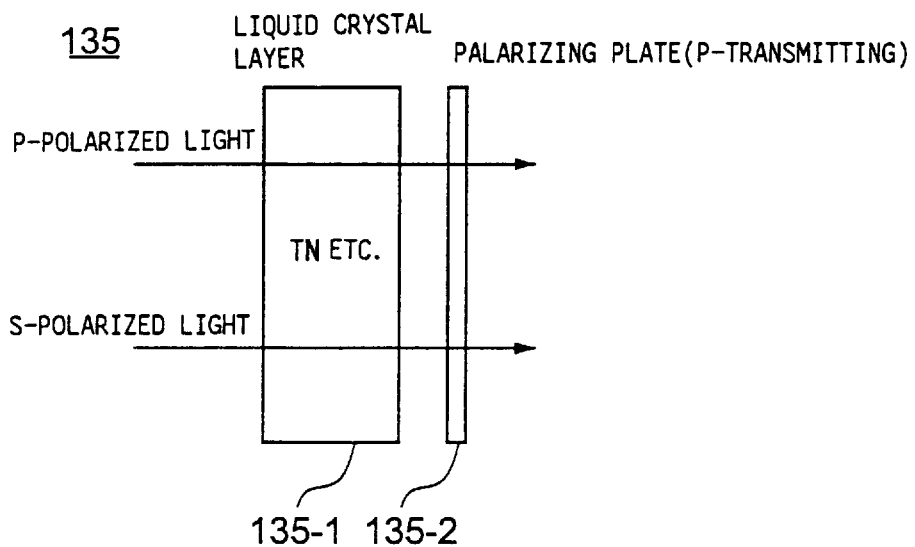
FIG. 8 is a diagram showing an important part of a liquid crystal panel.
Figure 9A:
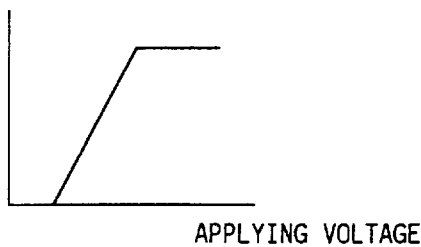
FIGS. 9A and 9B respectively are diagrams showing modulating characteristics of the liquid crystal panel shown in FIG. 8.
Figure 9B:
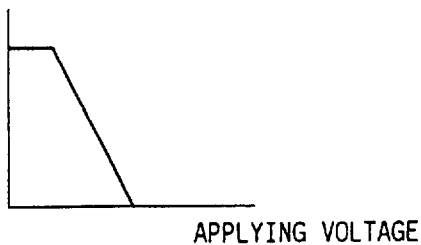

In this embodiment, the p-polarized light component and the s-polarized light component coexist within the light incident to the liquid crystal panel 135. For this reason, if a liquid crystal panel which modulates the brightness using the polarization as shown in FIG. 8 is used as the liquid crystal panel 135, the modulating characteristic becomes as shown in FIGS. 9A and 9B. FIG. 9A shows a modulating characteristic with respect to the p-polarized light, and FIG. 9B shows the modulating characteristic with respect to the s-polarized light. FIGS. 9A and 9B show the relationship of an applying voltage applied to a liquid crystal panel driver (not shown) and a transmittance of the light. Hence, it is necessary to drive the liquid crystal panel 135 by applying to the liquid crystal panel driver a voltage having black and white voltage levels which are reversed. In FIGS. 9A and 9B, the ordinate indicates the transmittance, and the abscissa indicates the applying voltage applied to the liquid crystal panel driver.

In FIG. 8, the light incident to the liquid crystal panel 135 as the p-polarized light is transmitted through a liquid crystal layer 135-1 which is made of TN, VA, FLC or the like, and is converted into the s-polarized light. This s-polarized light is further transmitted through a p-polarized light transmitting type polarizing plate 135-2, and is returned to the p-polarized light. On the other hand, the light incident to the liquid crystal panel 135 as the s-polarized light is transmitted through the liquid crystal layer 135-1, and is converted into the p-polarized light. This p-polarized light is transmitted as it is through the p-polarized light transmitting type polarizing plate 135-2. Accordingly, the applying voltage shown in FIG. 9A is applied to the liquid crystal panel driver with respect to the light incident to the liquid crystal panel 135 as the p-polarized light, and the applying voltage shown in FIG. 9B is applied to the liquid crystal panel driver with respect to the light incident to the liquid crystal panel 135 as the s-polarized light. By controlling the applying voltage for every pixel, it is possible to drive the liquid crystal panel 135 by a voltage having the black and white voltage levels which are reversed. It is desirable that the liquid crystal panel 135 is of a type which does not introduce a difference between the contrasts for normally black and normally white.

Figure 10:
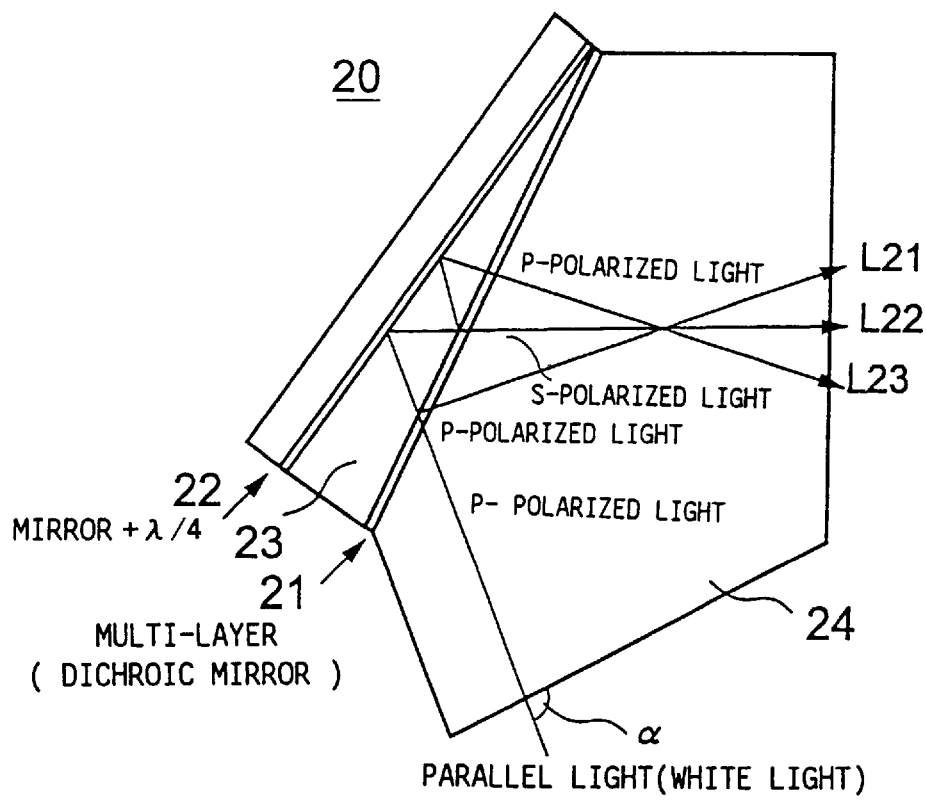
FIG. 10 is a diagram showing a second embodiment of the color separation element.
Figure 11:
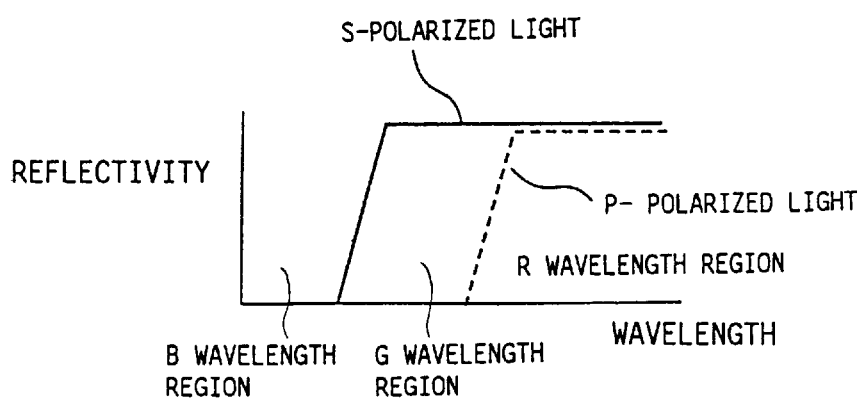
FIG. 11 is a diagram showing a characteristic of a polarization dependent reflecting element of the second embodiment of the color separation element.

FIG. 10 is a diagram showing a second embodiment of the color separation element according to the present invention. In addition, FIG. 11 is a diagram showing a characteristic of a polarization dependent reflecting element in the second embodiment of the color separation element. In FIG. 11, the ordinate indicates the reflectivity, and the abscissa indicates the wavelength of the light.

In FIG. 10, a color separation element 20 includes a polarization dependent reflecting element 21, a polarization converting element 22, and transparent members 23 and 24. The transparent members 23 and 24 are made of a material which is transparent with respect to the incident light to the color separation element 20, such as glass. The transparent member 23 has a wedge shape. The polarization dependent reflecting element 21 and the polarization converting element 22 are fixed on corresponding sides of the transparent member 23. Hence, the positional relationship of the polarization dependent reflecting element 21 and the polarization converting element 22 is maintained constant by the transparent member 23. In addition, the transparent member 24 is fixed on a side of the polarization dependent reflecting element 21 to which the incident light is incident to the color separation element 20. By providing this transparent member 24, it is possible to make the incident angle of the incident light with respect to the polarization dependent reflecting element 21 large as compared to the case where the incident light is incident to the polarization dependent reflecting element 21 via the air. An incident angle $\alpha$ of the incident light to the transparent member 24 is desirably 90 degrees. This incident angle $\alpha$ of the incident light to the transparent member 24 refers to an equivalent angle within the air. In other words, the incident angle is 90 degrees at the maximum within the air, but by providing a medium (transparent member 24) having a medium refractive index $n \approx 1.5$, for example, the incident angle becomes $\sin^{-1}(n \cdot \sin\theta_0)$ if the incident angle within the medium is denoted by $\theta_0$, and it becomes possible to realize an incident angle which is 90 degrees or greater with respect to the polarization dependent reflecting element 24.

In order to increase the shift of the cut wavelength due to the polarization, it is possible to increase the refractive index of the material forming the multi-layer structure of the polarization dependent reflecting element 21 or, to increase the incident angle of the incident light with respect to the polarization dependent reflecting element 21, for example. In this particular embodiment, the transparent member 24 is provided, so as to easily increase the incident angle of the incident light with respect to the polarization dependent reflecting element 21. In addition, since the polarization dependent reflecting element 21 and the polarization converting element 22 are unitarily fixed by the transparent member 23, it is unnecessary to adjust the positional relationship of the polarization dependent reflecting element 21 and the polarization converting element 22 after these elements are fixed.

As shown in FIG. 11, the polarization dependent reflecting element 21 has a different reflectivity depending on the polarization plane and the wavelength of the incident light, and the polarization dependent reflecting element 21 has a characteristic which reflects only the linearly polarized light component having a wavelength greater than or equal to a predetermined wavelength. More particularly, the polarization dependent reflecting element 21 reflects the light having the wavelength in the R region with respect to the p-polarized light, and reflects the light having a wavelength in the R and G region with respect to the s-polarized light. In this embodiment, the polarization dependent reflecting element 21 is formed by a dichroic filter or a dichroic mirror having a multi-layer structure which is made up of a material having a small refractive index such as MgF and a material having a large refractive index such as $TiO_2$.

On the other hand, the polarization converting element 22 is arranged via the transparent member 23 so as to form the predetermined angle with respect to the polarization dependent reflecting element 21. The polarization converting element 22 converts the p-polarized light component transmitted through the polarization dependent reflecting element 21 into the s-polarized light component, and converts the s-polarized light component transmitted through the polarization dependent reflecting element 21 into the p-polarized light component. The converted s-polarized light component and the converted p-polarized light component are reflected by the polarization converting element 22 towards the polarization dependent reflecting element 21. In this embodiment, the polarization converting element 22 is made up of a mirror and a $\lambda/4$ wave plate. The light incident to the polarization converting element 22 is transmitted through the $\lambda/4$ wave plate before reaching the mirror, and thus, the light is reflected by the mirror and is again transmitted through the $\lambda/4$ wave plate. Hence, the light incident to the polarization converting element 22 receives an effect similar to that of being transmitted through a $\lambda/2$ wave plate, and the polarization plane is rotated thereby.

Accordingly, in the case where the incident light is a p-polarized parallel white light, a p-polarized light component L21 of R, for example, is reflected by the polarization dependent reflecting element 21 and is output from the color separation element 20. In addition, p-polarized light components of G and B are transmitted through the polarization dependent reflecting element 21, and is reflected by the polarization converting element 22 as s-polarized components of G and B towards the polarization dependent reflecting element 21. Between the 2-polarized light components of G and B, a s-polarized light component L22 of B is transmitted through the polarization dependent reflecting element 21 and is output from the color separation element 20. On the other hand, the s-polarized light component of G is reflected by the polarization dependent reflecting element 21 again towards the polarization converting element 22. The s-polarized light component of G is reflected by the polarization converting element 22 as a p-polarized component of G towards the polarization dependent reflecting element 21. As a result, a p-polarized light component L23 of G is transmitted through the polarization dependent reflecting element 21 and is output from the color separation element 20. Among the linearly polarized light components L21 through L23 output from the color separation element 20, one of the two mutually adjacent linearly polarized light components is the s-polarized light component and the other is the p-polarized light component.

In other words, when the p-polarized light having the wider reflecting wavelength region is incident to the color separation element 20, the rotation of the polarization plane and the polarization dependency of the reflecting wavelength characteristic causes the lights of R, G and B to be output successively.

Figure 12:
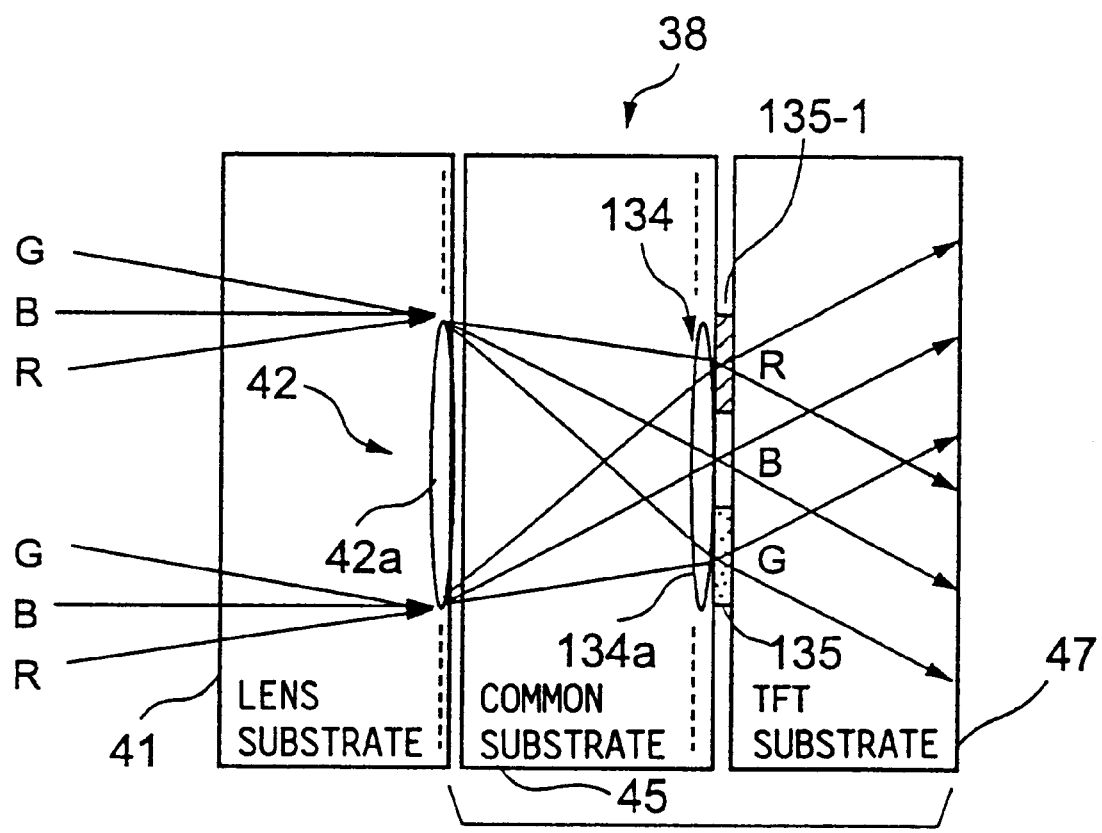
FIG. 12 is a diagram showing an important part of a second embodiment of the projection apparatus.

FIG. 12 is a diagram showing an important part of a second embodiment of the projection apparatus according to the present invention. This second embodiment of the projection apparatus employs the second embodiment of the color separation element described above. In FIG. 12, those parts which are the same as those corresponding parts in FIG. 5 are designated by the same reference numerals, and a description thereof will be omitted.

In FIG. 12, a modulating element 38 generally includes a lens substrate 41, a common substrate 45, and a TFT substrate 47. A lens array 42 made up of microlenses 42a is provided on the lens substrate 41. The lens array 134 made up of microlenses 134a is provided on the common substrate 45. A liquid crystal layer 135-1 is provided on the TFT substrate 47 to form the liquid crystal panel 135.

The p-polarized light component L21 of R, the s-polarized light component L22 of B, and the p-polarized light component L23 of G which are spectrally separated into three directions by the color separation element 20 as described above, become incident to the microlens 42a of the lens array 42 within the modulating element 38 at mutually different incident angles. After passing through the microlens 42a, these polarized light components L21, L22 and L23 are focused by the microlens 134a of the lens array 134 at mutually different focal points, and become incident to corresponding R, B and G pixels of the liquid crystal panel 135. By providing the lens array 42 at a stage preceding the lens array 134, it is possible to reduce the incident angle of the light with respect to the projection lens (not shown) which is provided at a stage subsequent to the modulating element 38. Hence, it is possible to reduce the aperture of the projection lens, and accordingly reduce the size of the projection apparatus as a whole. In this embodiment, the modulating element 38 is a transmission type element, and thus, the liquid crystal panel 135 is also a transmission type element.

Figure 13A:
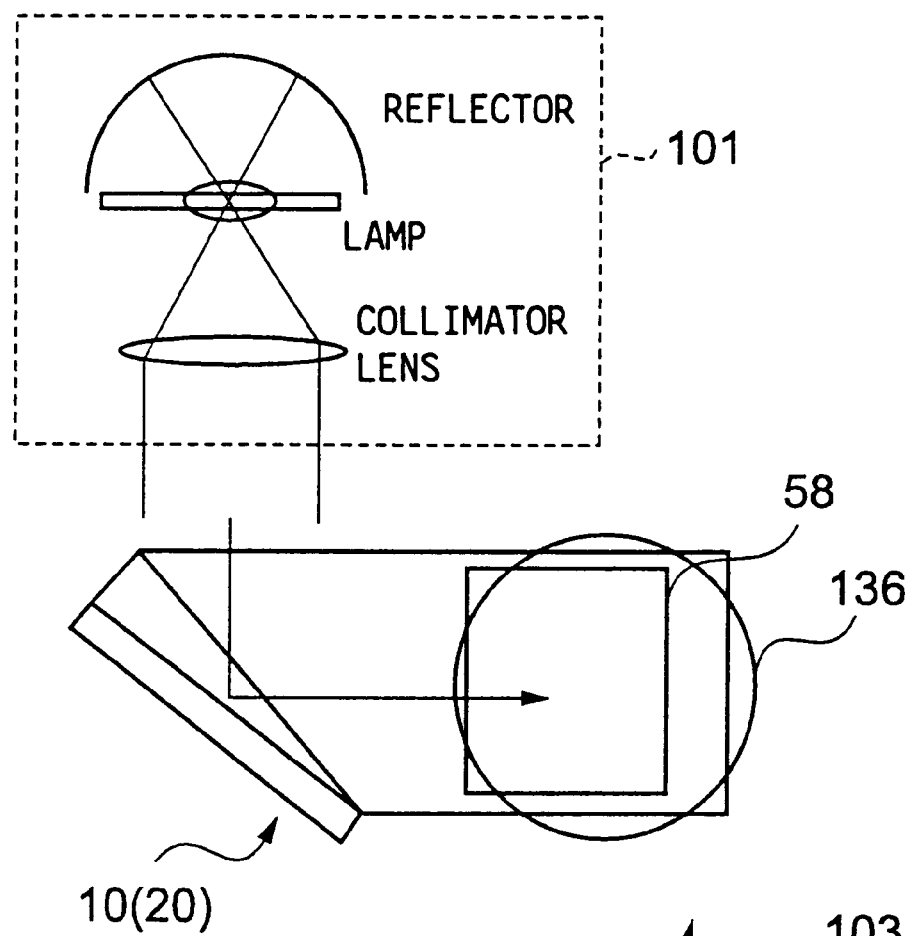
FIGS. 13A and 13B respectively are a side view and a plan view showing an important part of a third embodiment of the projection apparatus.
Figure 13B:
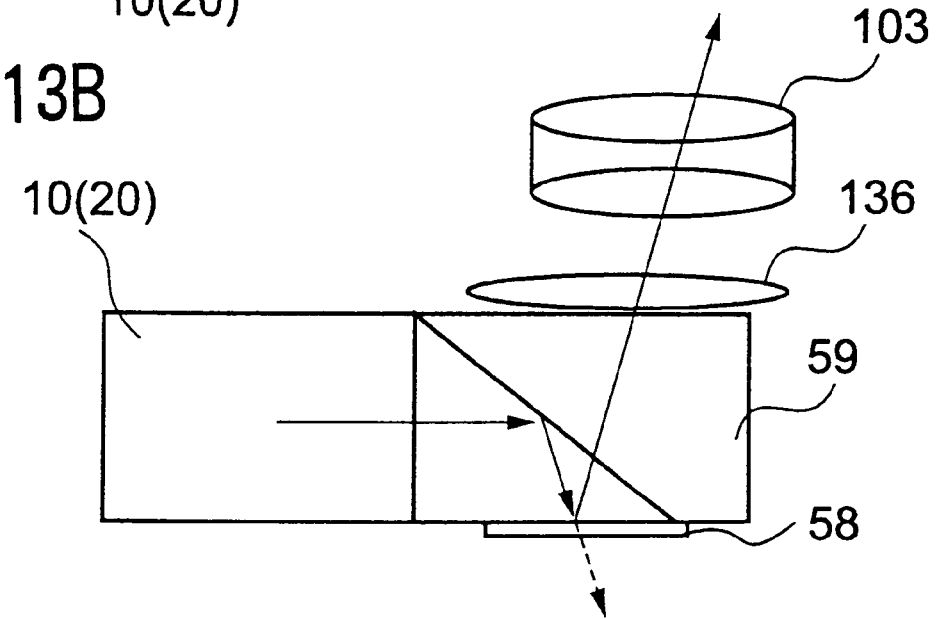
Figure 14:
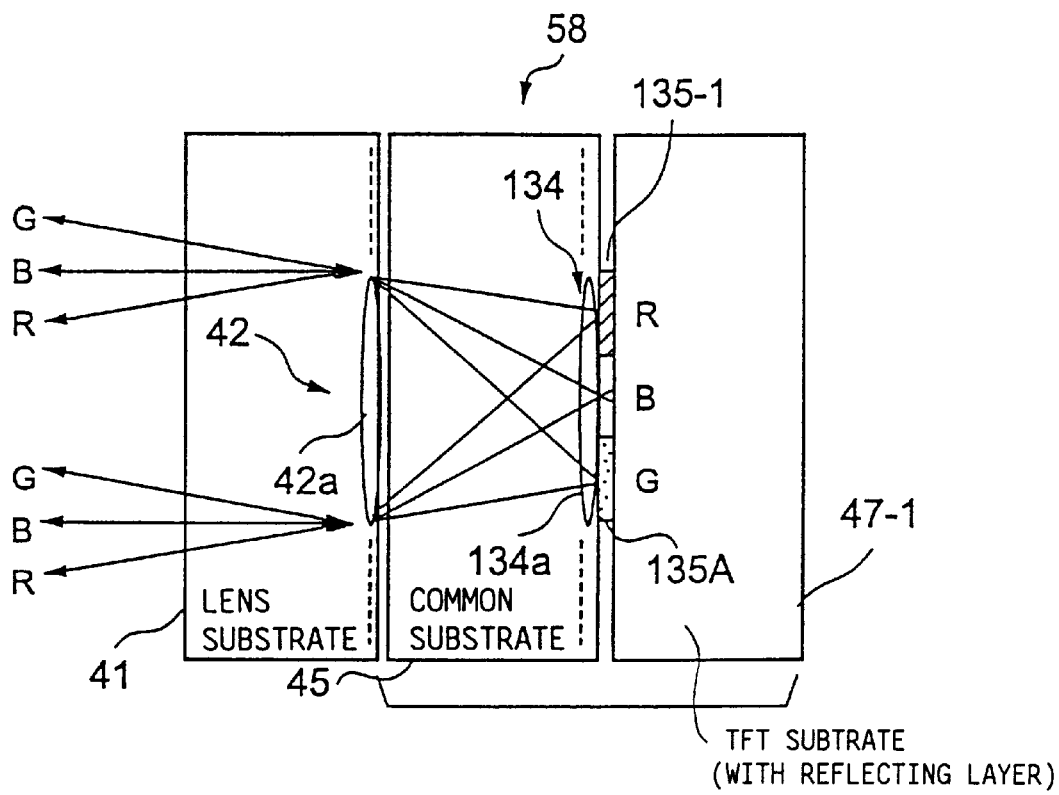
FIG. 14 is a diagram showing a modulating element of the projection apparatus shown in FIGS. 13A and 13B.

Next, a description will be given of a third embodiment of the projection apparatus according to the present invention, by referring to FIGS. 13A, 13B and 14. FIGS. 13A and 13B respectively are diagrams showing an important part of the third embodiment of the projection apparatus. FIG. 13A shows a side view of this important part of the third embodiment of the projection apparatus, and FIG. 13B shows a plan view of this important part of the third embodiment of the projection apparatus viewed from above FIG. 13A. In addition, FIG. 14 is a diagram showing a modulating element of the third embodiment of the projection apparatus. In FIGS. 13A, 13B and 14, those parts which are the same as those corresponding parts in FIGS. 2 and 12 are designated by the same reference numerals, and a description thereof will be omitted.

In FIGS. 13A and 13B, the light from the light source 101 is passed through the color separation element 10 or 20 and becomes incident to a modulating element 58. The modulator 58 is a reflection type element, and the light reflected by the modulator element 58 reaches the projection lens 103 via an angle dividing element 59 and the condenser lens 136. Since the modulating element 58 of this embodiment is a reflection type element, a liquid crystal panel 135A is also a reflection type element. As shown in FIG. 14, the liquid crystal panel 135A is made up of a TFT substrate 47-1 having a reflecting layer, and the liquid crystal layer 135-1.

The light which is spectrally separated by the color separation element 10 or 20 in a horizontal direction in FIG. 13A is reflected by the angle dividing element 59 towards the modulating element 58, and becomes incident to the liquid crystal panel 135A at a predetermined incident angle.

The light reflected by the liquid crystal panel 135A becomes incident to the angle dividing element 59 at an incident angle such that the light is not separated, and is transmitted through the angle dividing element 59. The light transmitted through the angle dividing element 59 reaches the projection lens 103 via the condenser lens 136. For example, the angle dividing element 59 is made up of a glass medium having a layer with a small refractive index provided therein, so as to divide the angle of the incident light depending on whether or not the incident light satisfies the total reflection condition. In other words, the angle dividing element 59 has a function of emitting the incident light as a transmitted light or a reflected light depending on the incident angle of the incident light.

Figure 15:
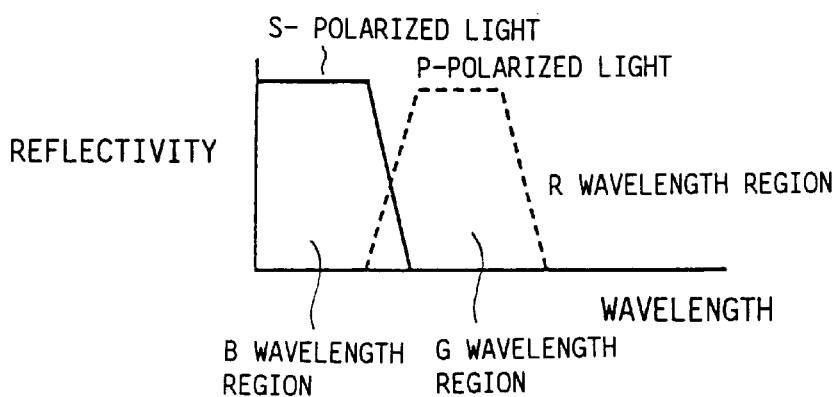
FIG. 15 is a diagram showing a characteristic of a polarization dependent reflecting element of a third embodiment of the color separation element.
Figure 16:
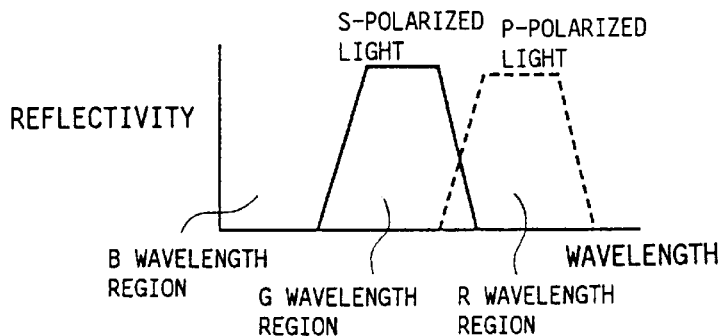
FIG. 16 is a diagram showing a characteristic of a polarization dependent reflecting element of a fourth embodiment of the color separation element.
Figure 17:
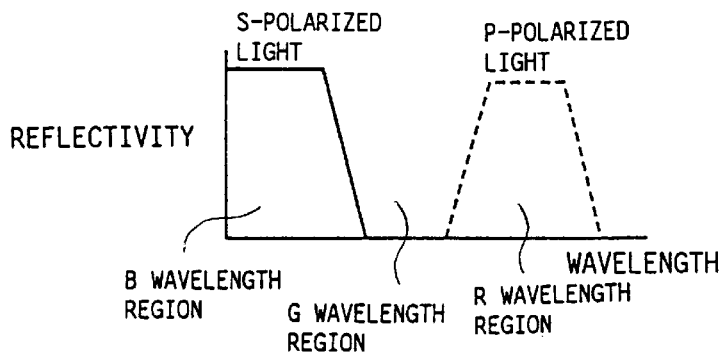
FIG. 17 is a diagram showing a characteristic of a polarization dependent reflecting element of a fifth embodiment of the color separation element.

Next, a description will be given of the reflecting characteristics of third through fifth embodiments of the color separation element according to the present invention, by referring to FIGS. 15 through 17. In FIGS. 15 through 17, the ordinate indicates the reflectivity, the abscissa indicates the wavelength of the light, a solid line indicates the s-polarized light component, and a dotted line indicates the p-polarized light component. In the first and second embodiments of the color separation element described above, the polarization dependent reflecting element reflects the light having the wavelength in the regions of B and G for the p-polarized light and reflects the light having the wavelength in the region of B for the s-polarized light or, the polarization dependent reflecting element reflects the light having the wavelength in the region of R for the p-polarized light and reflects the light in the wavelength in the regions of R and G for the s-polarized light. However, the characteristic of the polarization dependent reflecting element simply needs to have a characteristic such that the wavelength region of one of R, G and B is different due to polarization within the visible light.

FIG. 15 is a diagram showing the characteristic of the third embodiment of the color separation element. In this embodiment, the polarization dependent reflecting element reflects the light having the wavelength in the region of G for the p-polarized light, and reflects the light having the wavelength in the region of B for the s-polarized light.

FIG. 16 is a diagram showing the characteristic of the fourth embodiment of the color separation element. In this embodiment, the polarization dependent reflecting element reflects the light having the wavelength in the region of R for the p-polarized light, and reflects the light having the wavelength in the region of G for the s-polarized light.

FIG. 17 is a diagram showing the characteristic of the fifth embodiment of the color separation element. In this embodiment, the polarization dependent reflecting element reflects the light having the wavelength in the region of R for the p-polarized light, and reflects the light having the wavelength in the region of B for the s-polarized light.

Next, a description will be given of a sixth embodiment of the color separation element according to the present invention, by referring to FIGS. 18 through 22. In this embodiment, the incident angle is made different for the p-polarized light and the s-polarized light. Normally, when the incident angle of the incident light to the dichroic mirror is changed, the cut wavelength shifts. Hence, this embodiment utilizes this shift of the cut wavelength, so as to cut the unwanted wavelength region. More particularly, the wavelength region of an unwanted cyan (C) light is cut.

When a yellow (Y) light or C light mixes into the display of the R or B, the purity of the respective colors deteriorate, thereby reducing the color reproduction region. Hence, it is desirable to cut the wavelength region of the unwanted light such as the Y and C lights, in order to suppress such a deterioration of the color purity.

Figure 18:
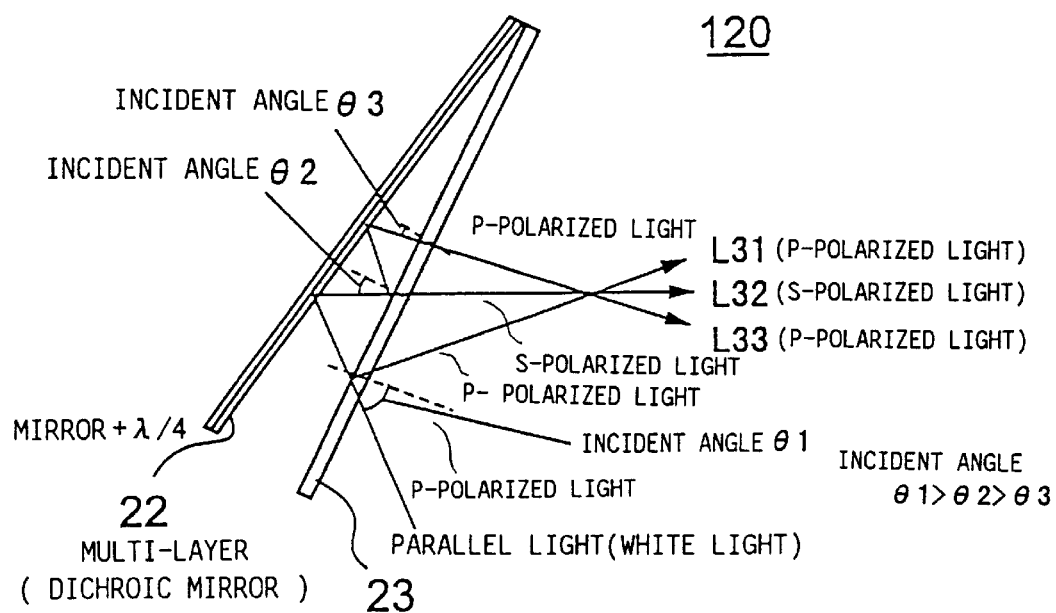
FIG. 18 is a diagram showing a sixth embodiment of the color separation element.
Figure 20A:
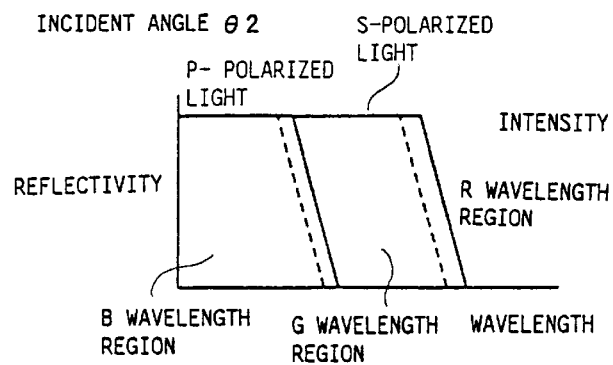
FIGS. 20A and 20B respectively are diagrams showing a reflecting spectral characteristic of a polarization dependent reflecting element and a spectral characteristic of a light traveling towards a polarization converting element at a part of the color separation element shown in FIG. 18.
Figure 20B:
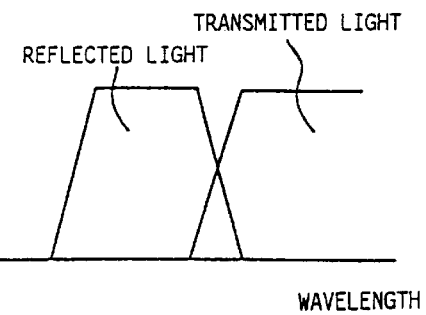
Figures 21A, 21B:
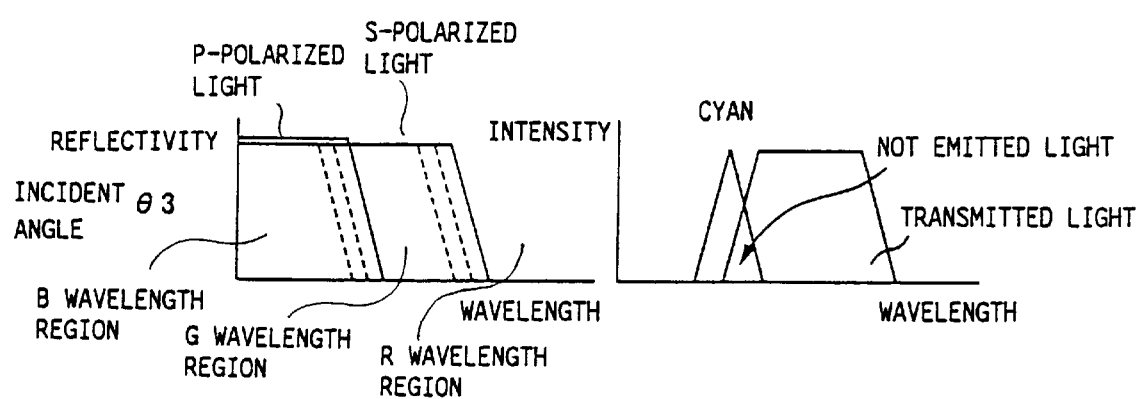
FIGS. 21A and 21B respectively are diagrams showing a reflecting spectral characteristic of a polarization dependent reflecting element and a spectral characteristic of a light traveling towards a polarization converting element at a part of the color separation element shown in FIG. 18.
Figure 22:
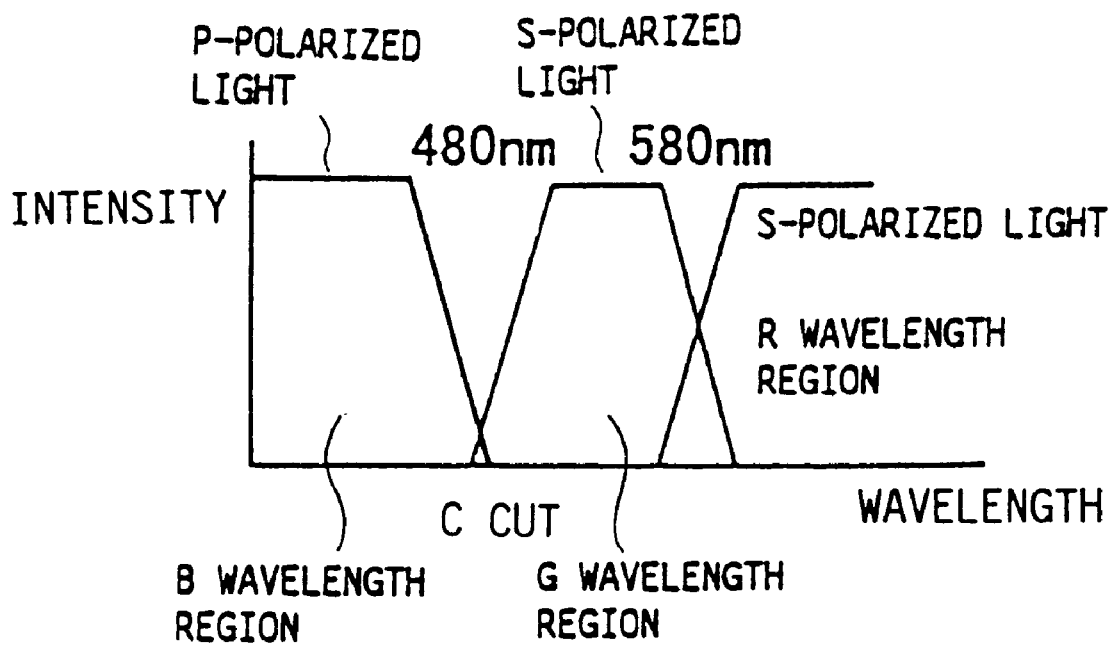
FIG. 22 is a diagram showing a spectral characteristic of a light emitted from the color separation element shown in FIG. 18.

FIG. 18 is a diagram showing the sixth embodiment of the color separation element. In FIG. 18, those parts which are the same as those corresponding parts in FIG. 10 are designated by the same reference numerals, and a description thereof will be omitted. FIGS. 19A through 21B respectively are diagrams showing a reflecting spectral characteristic of the polarization dependent reflecting element and a spectral characteristic of a light traveling towards the polarization converting element, at various parts of the color separation element shown in FIG. 18. Further, FIG. 22 is a diagram showing a spectral characteristic of a light emitted from the color separation element shown in FIG. 18.

In FIG. 18, a color separation element 120 includes the polarization dependent reflecting element 21, the polarization converting element 22, and the transparent members 23 and 24. The polarization dependent reflecting element 21 has a reflectivity which differs depending on the polarization plane and the wavelength of the incident light, and reflects only the linearly polarized light component having a wavelength greater than or equal to a predetermined wavelength. More particularly, the polarization dependent reflecting element 21 reflects the light having the wavelength in the region of R for the p-polarized light, and reflects the light having the wavelength in the regions of R and G for the s-polarized light.

Figure 19A:
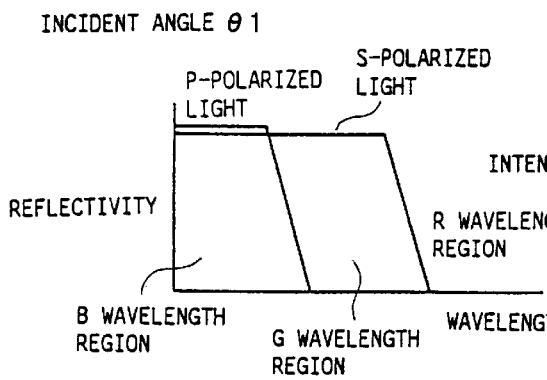
FIGS. 19A and 19B respectively are diagrams showing a reflecting spectral characteristic of a polarization dependent reflecting element and a spectral characteristic of a light traveling towards a polarization converting element at a part of the color separation element shown in FIG. 18.
Figure 19B:
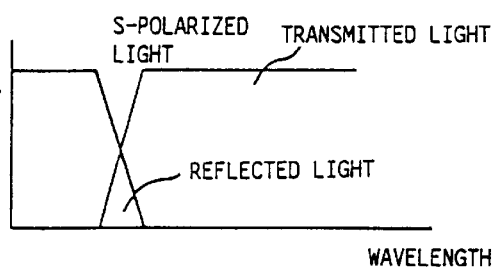

The parallel white incident light from the light source (not shown) becomes incident to the polarization dependent reflecting element 21 at an incident angle θ1. FIG. 19A shows the reflecting spectral characteristic of the polarization dependent reflecting element 21 with respect to this incident angle θ1, wherein the ordinate indicates the reflectivity and the abscissa indicates the wavelength of the light. Hence, a p-polarized light component L31 of R which is reflected by the polarization dependent reflecting element 21 is output from the color separation element 120. The p-polarized light components of G and B are transmitted through the polarization dependent reflecting element 21, and travel towards the polarization converting element 22. FIG. 19B shows the spectral characteristic of the light, which includes the p-polarized light components of G and B, traveling towards the polarization converting element 22 from the polarization dependent reflecting element 21. In FIG. 19B, the ordinate indicates the light intensity, and the abscissa indicates the wavelength of the light.

The p-polarized light components of G and B are converted into the s-polarized light components of G and B by the polarization converting element 22, and become incident to the polarization dependent reflecting element 21 at an incident angle θ2, where angle θ1>θ2. FIG. 20A shows the reflecting spectral characteristic of the polarization dependent reflecting element 21 with respect to the incident angle θ2, wherein the ordinate indicates the reflectivity and the abscissa indicates the wavelength of the light. In FIG. 20A, a solid line indicates a cut wavelength which shifts due to a change in the incident angle, and a dotted line indicates a cut wavelength before the incident angle changes. In other words, the dotted line in FIG. 20A corresponds to the solid line shown in FIG. 19A. Hence, a s-polarized light component L32 of B transmitted through the polarization dependent reflecting element 21 is output from the color separation element 120. The s-polarized light component G is reflected by the polarization dependent reflecting element 21, and travels towards the polarization converting element 22. FIG. 20B shows the spectral characteristic of the light, which includes the s-polarized light component of G, traveling towards the polarization converting element 22 from the polarization dependent reflecting element 21. In FIG. 20B, the ordinate indicates the light intensity, and the abscissa indicates the wavelength of the light.

On the other hand, the s-polarized light component of G is again reflected by the polarization dependent reflecting element 21 towards the polarization converting element 22. This s-polarized light component of G is converted into the p-polarized light component of G by the polarization converting element 22, and becomes incident to the polarization dependent reflecting element 21 at an incident angle θ3, where angle θ2>θ3. FIG. 21A shows the reflecting spectral characteristic of the polarization dependent reflecting element 21 with respect to the incident angle θ3, wherein the ordinate indicates the reflectivity and the abscissa indicates the wavelength of the light. In FIG. 21A, a solid line indicates a cut wavelength which shifts due to a change in the incident angle, and a dotted line indicates a cut wavelength before the incident angle changes. In other words, the dotted line in FIG. 21A corresponds to the solid lines shown in FIG. 19A and FIG. 20A. Hence, a p-polarized light component L33 of G transmitted through the polarization dependent reflecting element 21 is output from the color separation element 120. FIG. 21B shows the spectral characteristic of the light traveling towards the polarization converting element 22 from the polarization dependent reflecting element 21. In FIG. 21B, the ordinate indicates the light intensity, and the abscissa indicates the wavelength of the light.

FIG. 22 is a diagram showing a spectral characteristic of a light, which includes the linearly polarized light components L31 through L33, and is finally emitted from the polarization dependent reflecting element 21 as the output of the color separation element 120. In FIG. 22, the ordinate indicates the light intensity, and the abscissa indicates the wavelength of the light. Among the linearly polarized light components L31 through L33 which are output from the color separation element 120, one of the two mutually adjacent linearly polarized light components is the s-polarized light component and the other is the p-polarized light component. In other words, when the p-polarized light having the wider reflecting wavelength region is incident to the color separation element 120, the rotation of the polarization plane and the polarization dependency of the reflecting wavelength characteristic causes the lights of R, G and B to be output successively. In addition, as may be readily seen from FIG. 22, it is possible in this embodiment to cut the wavelength region of the unwanted C light.

When cutting the wavelength region of the unwanted yellow (Y) light, the color separation element simply needs to be constructed similarly as described above and to satisfy a relationship θ1<θ2<θ3 which is reversed compared to the relationship of the reflecting wavelengths for the case shown in FIG. 18. Accordingly, the illustration and description of the color separation element for the case where the wavelength region of the unwanted Y light is cut will be omitted.

Further, the present invention is not limited to these embodiments, but various variations and modifications may be made without departing from the scope of the present invention.

What is claimed is:

1. A color separation element comprising:
   a polarization dependent reflecting element having different reflectivity dependent on a polarization plane and a wavelength of an incident light; and
   a polarization converting element, arranged at a predetermined angle to said polarization dependent reflecting element, for converting one linearly polarized light between a p-polarized light component and a s-polarized light component transmitted through said polarization dependent reflecting element into the other linearly polarized light which is reflected towards said polarization dependent reflecting element, and converting the other linearly polarized light between the p-polarized light component and the s-polarized light component transmitted through said polarization dependent reflecting element into the one linearly polarized light which is reflected towards said polarization dependent reflecting element.

2. The color separation element as claimed in claim 1, which further comprises:

a transparent member unitarily fixed between said polarization dependent reflecting element and said polarization converting element so as to maintain said predetermined angle.

3. The color separation element as claimed in claim 1, which further comprises:

a transparent member provided on a side of said polarization dependent reflecting element first receiving the incident light.

4. The color separation element as claimed in claim 1, wherein a linearly polarized light component in an unwanted wavelength region is eliminated by selecting settings of an incident angle of the incident light with respect to said polarization dependent reflecting element and said predetermined angle.

5. A color separation element comprising:

a polarization dependent reflecting element reflecting a light in a first wavelength region and transmitting a light in wavelength regions other than the first wavelength region with respect to a first polarized light component, and reflecting a light in a second wavelength region and transmitting a light in wavelength regions other than the second wavelength region with respect to a second polarized light component; and a polarization converting element, arranged at a predetermined angle to said polarization dependent reflecting element, for converting a polarized light component of the light transmitted through said polarization dependent reflecting element into an orthogonal polarized light component which is reflected towards said polarization dependent reflecting element.

6. A projection apparatus comprising:

a light source;

a color separation element comprising a polarization dependent reflecting element and a polarization converting element, said polarization dependent reflecting element having a different reflectivity dependent on a polarization plane and a wavelength of an incident light from said light source, said polarization converting element being arranged at a predetermined angle to said polarization dependent reflecting element, for converting one linearly polarized light between a p-polarized light component and a s-polarized light component transmitted through said polarization dependent reflecting element into the other linearly polarized light which is reflected towards said polarization dependent reflecting element, and converting the other linearly polarized light between the p-polarized light component and the s-polarized light component transmitted through said polarization dependent reflecting element into the one linearly polarized light which is reflected towards said polarization dependent reflecting element; and a modulating element receiving at least three linearly polarized light components from said color separation element, and outputting a light which is to be projected on a screen via a projecting system.

7. The projection apparatus as claimed in claim 6, wherein said modulating element comprises:

a first microlens array layer; and a liquid crystal array layer receiving the linearly polarized light component via said first microlens array layer.

8. The projection apparatus as claimed in claim 7, wherein said modulating element further comprises:

a second microlens array layer, arranged at a stage prior to said first microlens array layer, adjusting an incident angle of the light output to the projecting system.

9. The projection apparatus as claimed in claim 8, wherein said modulating element further comprises:

an angle dividing element making a shift so that an incident angle of the light to said liquid crystal array layer and an emission angle of the light from said liquid crystal array layer are different from each other.

10. The projection apparatus as claimed in claim 6, wherein said color separation element further comprises:

a transparent member unitarily fixed between said polarization dependent reflecting element and said polarization converting element so as to maintain said predetermined angle.

11. The projection apparatus as claimed in claim 6, wherein said color separation element further comprises:

a transparent member provided on a side of said polarization dependent reflecting element first receiving the incident light.

12. The projection apparatus as claimed in claim 6, wherein said color separation element eliminates a linearly polarized light component in an unwanted wavelength region by selecting settings of an incident angle of the incident light with respect to said polarization dependent reflecting element and said predetermined angle.

13. A projection apparatus comprising:

a light source;

a color separation element comprising a polarization dependent reflecting element and a polarization converting element, said polarization dependent reflecting element reflecting a light in a first wavelength region and transmitting a light in wavelength regions other than the first wavelength region with respect to a first polarized light component, and reflecting a light in a second wavelength region and transmitting a light in wavelength regions other than the second wavelength region with respect to a second polarized light component, said polarization converting element being arranged at a predetermined angle to said polarization dependent reflecting element, for converting a polarized light component of the light transmitted through said polarization dependent reflecting element into an orthogonal polarized light component which is reflected towards said polarization dependent reflecting element;

a modulating element receiving at least three linearly polarized light components from said color separation element and outputting a light; and a screen on which the light output from said modulating element is projected.

\* \* \* \* \*